United States Patent
Hashima et al.

(10) Patent No.: US 6,816,783 B2
(45) Date of Patent: Nov. 9, 2004

(54) NAVIGATION SYSTEM HAVING IN-VEHICLE AND PORTABLE MODES

(75) Inventors: Saburo Hashima, Kuwana (JP); Ko Narita, Ama-gun (JP); Masaki Ebi, Kariya (JP); Tooru Inoue, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/270,523

(22) Filed: Oct. 16, 2002

(65) Prior Publication Data

US 2004/0204840 A1 Oct. 14, 2004

(30) Foreign Application Priority Data

Nov. 30, 2001 (JP) .......................................... 2001-366535

(51) Int. Cl.[7] .......................... G01C 21/00; G08G 1/123
(52) U.S. Cl. ........................ 701/209; 701/211; 701/213; 340/995.16
(58) Field of Search ................................. 701/200, 208, 701/209, 211, 212, 213, 201, 210, 214; 340/995.14, 995.15, 995.16, 995.17, 995.19, 995.25, 995.27, 995.28, 995.2

(56) References Cited

U.S. PATENT DOCUMENTS

| | | | | |
|---|---|---|---|---|
| 5,546,092 A | | 8/1996 | Kurokawa et al. | ...... 342/357.01 |
| 5,794,164 A | * | 8/1998 | Beckert et al. | ............ 455/3.06 |
| 5,917,435 A | * | 6/1999 | Kamiya et al. | ........ 340/995.26 |
| 6,124,826 A | * | 9/2000 | Garthwaite et al. | .... 342/357.09 |
| 6,125,326 A | * | 9/2000 | Ohmura et al. | ............. 701/213 |
| 6,418,374 B2 | * | 7/2002 | Sakamoto et al. | .......... 701/209 |
| 6,427,115 B1 | * | 7/2002 | Sekiyama | .................... 701/208 |
| 2001/0021894 A1 | | 9/2001 | Sakamoto et al. | .......... 701/209 |

FOREIGN PATENT DOCUMENTS

| | | |
|---|---|---|
| JP | A-H05-40441 | 2/1993 |
| JP | A-H07-55488 | 3/1995 |
| JP | A-H07-280583 | 10/1995 |
| JP | A-H08-146869 | 6/1996 |
| JP | A-H09-43334 | 2/1997 |
| JP | A-H10-318763 | 12/1998 |
| JP | A-2000-28390 | 1/2000 |
| JP | A-2000-55693 | 2/2000 |
| JP | A-2000-329578 | 11/2000 |
| JP | A-2001-027543 | 1/2001 |
| JP | A-2001-324350 | 11/2001 |
| JP | A-2002-31538 | 1/2002 |
| JP | A-2003-50133 | 2/2003 |

\* cited by examiner

Primary Examiner—Tan Q. Nguyen
(74) Attorney, Agent, or Firm—Posz & Bethards, PLC

(57) ABSTRACT

A navigation system executes a portable mode for guiding a person when a GPS antenna is connected with it and a speed signal has not been inputted for ten seconds or more. The portable mode enables a predetermined function being non-functional in an in-vehicle mode for guiding a vehicle while it disables a predetermined function being functional in the in-vehicle mode. It furthermore modifies, for the portable mode, a predetermined function set in the in-vehicle mode. The navigation system can thereby utilize functions suitable for guiding a person-guiding instead of guiding a vehicle, which effect enhances usability of the system.

6 Claims, 4 Drawing Sheets

NAVIGATION SYSTEM HAVING IN-VEHICLE AND PORTABLE MODES

CROSS REFERENCE TO RELATED APPLICATION

This application is based on and incorporates herein by reference Japanese Patent Application No. 2001-366535 filed on Nov. 30, 2001.

FIELD OF THE INVENTION

The present invention relates to a navigation system, such as a car navigation system, which is operable in an in-vehicle mode suitable for guiding a vehicle and a portable mode suitable for guiding a person.

BACKGROUND OF THE INVENTION

A car navigation system is often usable not only in a vehicle but also outside the vehicle. Here, the navigation system is carried by a user to guide him to a destination as used as the car navigation.

However, the use of the same functions as the car navigation possibly demonstrates unsuitability for guiding the walking user, resulting in choosing an inappropriate detour depending on the circumstances.

There is a difference between vehicle driving and person walking in items such as a speed, a passing position, proceeding restriction, and a purpose. The navigation system is hence requested to have dedicated displaying or operations according to each application.

SUMMARY OF THE INVENTION

An object of the present invention is to provide a navigation system which is not only used for guiding a vehicle but also for guiding a person with corresponding appropriate functions.

To achieve the above object, the navigation system is operable in in-vehicle and portable modes for guiding a vehicle and a person, respectively. When the navigation system detects release of the connection with the vehicle, it shifts to the portable mode from the in-vehicle mode. In the portable mode, the navigation system enables functions, which are not functional in the in-vehicle mode. In one embodiment of the invention, in the portable mode, the navigation system disables functions, which are functional in the in-vehicle mode. In another embodiment, in the portable mode, the navigation system modifies functions used in the in-vehicle mode.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
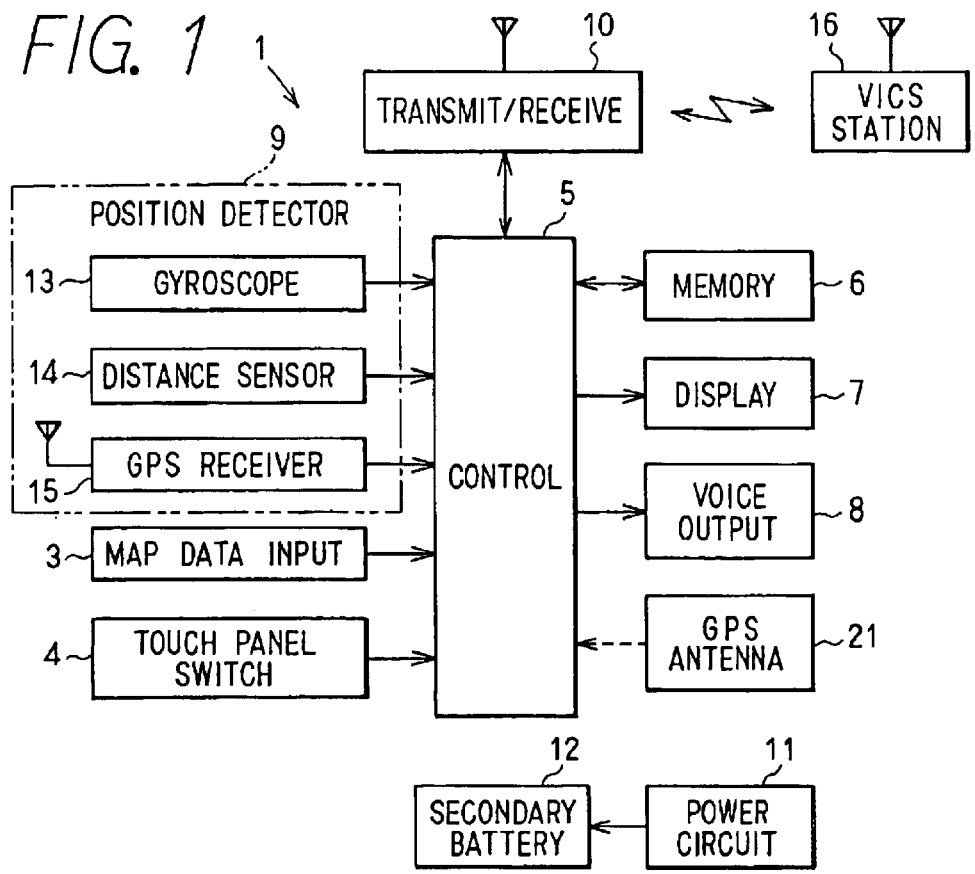
FIG. 1 is a block diagram illustrating an electronic structure of a navigation system according to an embodiment of the present invention.

Referring to FIG. 1, an electronic circuit of a main unit 1 of a navigation system is composed of a map data input unit 3, a touch panel switch 4, a controller 5, an external memory 6, a liquid crystal display (LCD) 7 combining the touch panel switch 4, and an voice output unit 8. In addition, a position detector 9 and a transmitter and receiver 10 for a vehicle information and communication system (VICS) are connected with the main unit 1.

A power circuit 11 powers the above electronic circuits while it stabilizes a voltage of a car battery. The power circuit 11 charges a secondary battery 12, while the main unit 1 is turned off. The secondary battery 12 powers the electronic components, when the power circuit 11 is detached from the car battery. The controller 5, formed as a computer, is provided with well-known devices such as a CPU, ROM, RAM, I/O and bus line connected with the foregoing devices.

The position detector 9 is provided with also well-know devices. These are a gyroscope 13, a distance sensor 14, and a global positioning system (GPS) receiver 15 for positioning the vehicle using radio waves from GPS satellites. Inherent tolerances of the devices require interpolation using a plurality of sensors. High positioning accuracy may require adding sensors such as a geomagnetic sensor, a steering rotation sensor, and wheel sensors. Though the vehicle speed signal may be directly inputted to the controller 5, the embodiment adopts, as the vehicle speed signal, the distance change from the distance sensor 14.

The map data input unit 3 is for inputting various data such as map-matching data for improving the positioning accuracy, map data, and landmark data. Large memory size of the data often needs to utilize a compact disc (CD) and a digital versatile disc (DVD), but memory media such as a memory card or an undetachable memory such as a hard disc drive (HDD) can be used.

The LCD 7 is capable of superimposition. A vehicle-position mark from the position detector 5, a map data from the map input unit 3 and additional data such as a guiding route are superposed according to instructions from the controller 5.

The controller 5 can freely change a size of character data such as facility names and addresses in displaying the map data from the map data input unit 3. Here, font data stored in the external memory 6 are used. The font data enables the character size to be free as an outline font, and a plurality of fixed-sized fonts as images can be also available.

The controller 5 is also capable of routing assistance so that input of a destination through the touch panel switch 4 automatically leads to setting appropriate routing. The automatic routing assistance uses Dijkstra's algorism or other similar ones. The controller 5 also receives information through the VICS transmitter and receiver 10 from a VICS base station of the VICS system to reflect in the routing assistance.

Figure 2:
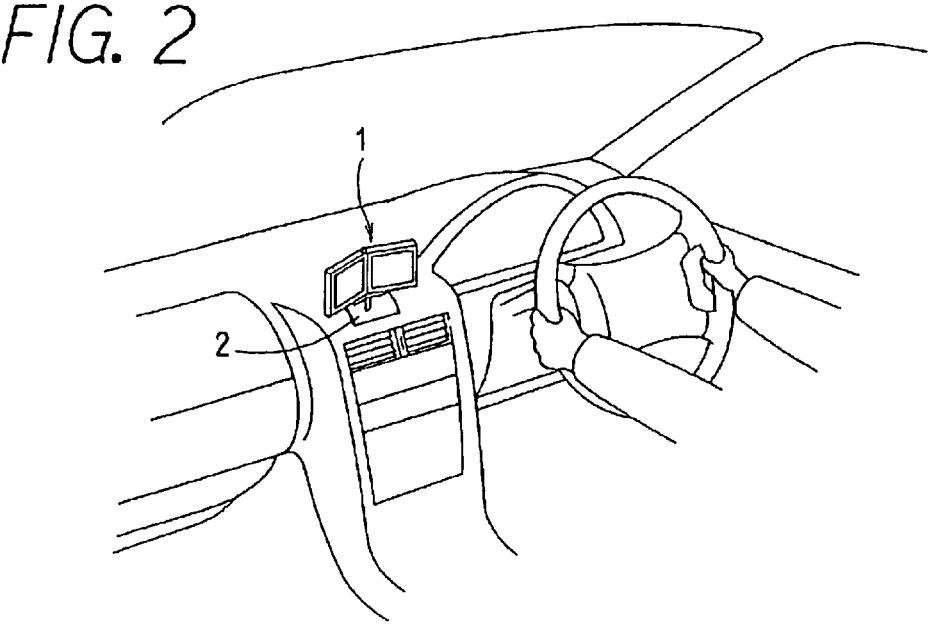
FIG. 2 is a perspective view illustrating the navigation system mounted in a vehicle according to the embodiment.

The main unit 1 of the navigation system is, through one-touch operation, attached to a mounter 2 installed inside the vehicle as shown FIG. 2. The main unit 1, whose power plug is inserted into a cigarette lighter socket (not shown), can be supplied with the power from the car battery.

The main unit 1 consists of a first body 17 and a second body 18, both of which are connected by a hinge 19 to fold. The first and second bodies 17 and 18 each is rectangular and provided with the LCD 7 combining, in the front, the matrix type touch panel switch 4 (not shown in FIG. 3). The fist body 17 has an ON/OFF power switch while the second body 18 is able to be fitted with a compact GPS antenna 21.

Figure 4:
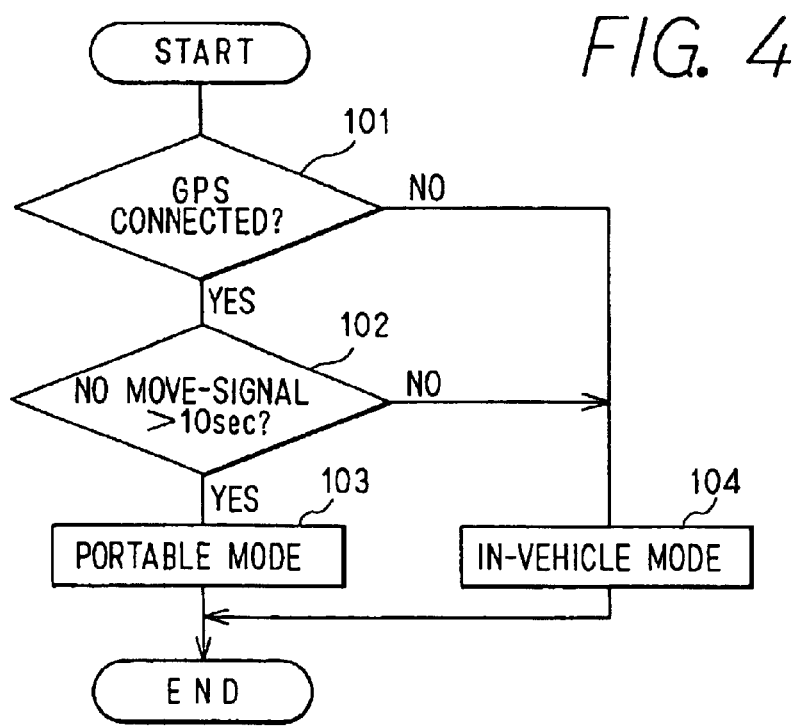
FIG. 4 is a flow diagram illustrating an operation of the navigation system according to the embodiment.
Figure 5:
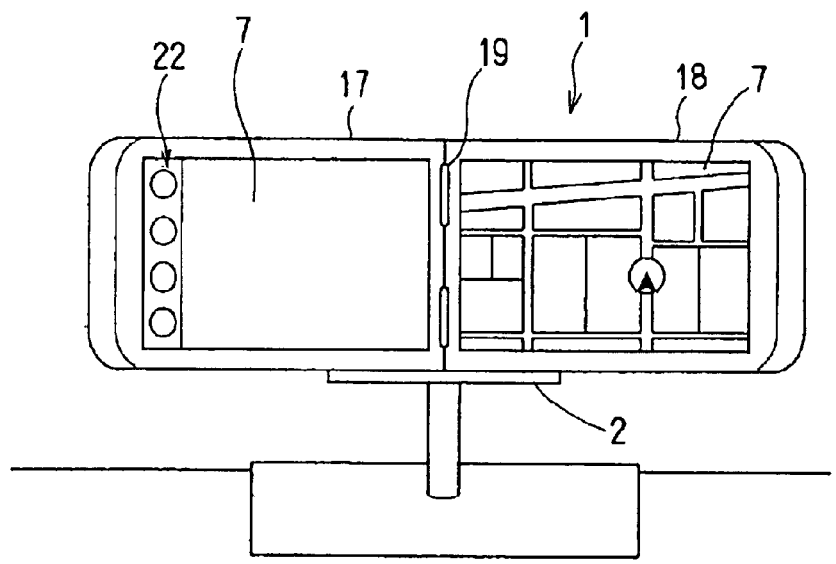
FIG. 5 is an elevational view illustrating the navigation system mounted in the vehicle according to the embodiment.

The operation of the embodiment is explained referring to FIG. 4. The controller 5, when turned on, determines whether the connection of the GPS antenna 21 to the main unit 1 at step 101. Determining no connection of the GPS antenna 21 (NO at step 101) leads to an in-vehicle mode (car navigation mode). In the in-vehicle mode at step 104, the controller 5 determines an existing position based on the information from the position detector 9. It then displays the preset scale map including the existing position on the LCD 7 of the second body 18 as shown in FIG. 5. The map includes a cursor indicating the vehicle's existing position. The LCD 7 of the first body 17 displays touch panel buttons 22. In the in-vehicle mode, the LCD 7 shows up and down as shown in FIG. 5.

The controller 5 determines the manipulation upon the touch panel buttons 22 based on the ON/OFF of the touch panel switch 4, hence executing various well-known operations relating to the car navigation.

Figure 6:
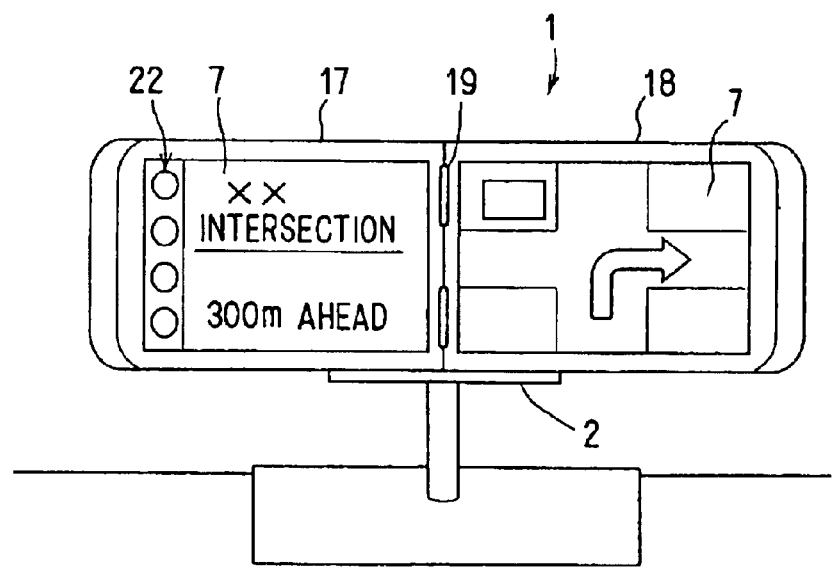
FIG. 6 is an elevational view illustrating the navigation system, displaying an instance of route guidance, mounted in the vehicle according to the embodiment.

The controller 5 sets a recommended routing to execute routing assistance when the user requests routing assistance to a destination. For instance, when turning right at a target intersection is instructed, assistance is executed through the display and voice in a position 300 meters short of the target intersection. The LCD 7 of the second body 18 displays an arrow indicating turning right at the target intersection on the map while the LCD 7 of the first body 17 displays a message of "XX intersection is 300 meters ahead" as shown in FIG. 6. In addition, the voice output unit 8 outputs a guidance of the effect. The user thus easily drives to the destination by following the routing assistance through the main unit 1. Moreover, congestion information from the VICS base station 16 enables the controller 5 to choose the routing avoiding traffic jam.

When the user reaches the destination by car and heads for the next destination on foot, the user still wants to utilize the routing functions of the main unit 1. In this case, the user detaches the main unit 1 from the mounter 2 with detaching the power cable and cables of the position detector 9 and others. Here, the main unit 1 can be powered by the secondary built-in battery 12 to continue to run.

Figure 3:
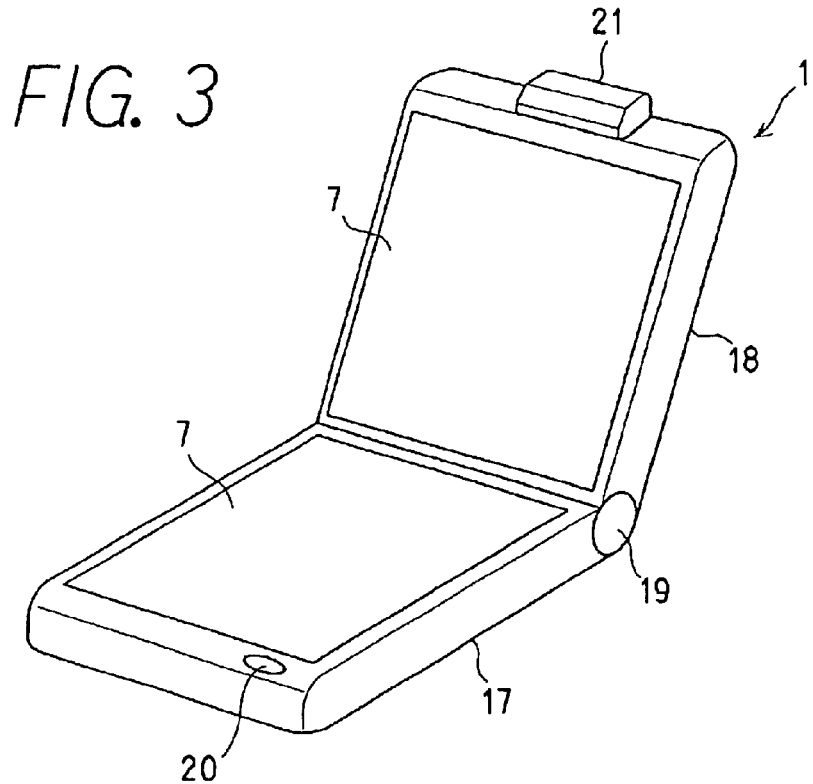
FIG. 3 is a perspective view illustrating the navigation dismounted from the vehicle according to the embodiment.

The user then connects the compact GPS antenna 21 with the main unit 1 as shown in FIG. 3. The controller 5 thereby determines the connection of the GPS antenna (YES at step 101). Additional determining of no input of the vehicle speed signal for more than a preset period (YES at step 102) results in determining the detachment of the main unit 1 from the vehicle. The determining of the detachment causes the controller 5 to shift to the portable mode (or man-navigation mode) at step 103. In addition, the detachment from vehicle can be determined only at step 102 without step 101.

At a start of the portable mode, the controller 5 registers the existing position and time. Specifically, the controller 5 determines the portable mode, then registering, into the memory (not shown) inside the controller 5 or the external memory 6, leaving time (time when the user leaves the vehicle) and a vehicle position (a position where the vehicle exists). Here, the leaving time alone may be registered in the operation.

The registered vehicle position can be lately set as a destination or a passing point by the user's manipulation as described later. Setting it as the destination enables routing assistance from the place where the user is existing to the vehicle position. Setting it as the passing point enables the routing assistance from the place where the user is existing through the vehicle position as the passing point to the destination. The parking period (elapsed time) from leaving the vehicle can be calculated based on the registered leaving time and the time when the user returns to the vehicle.

Figure 7:
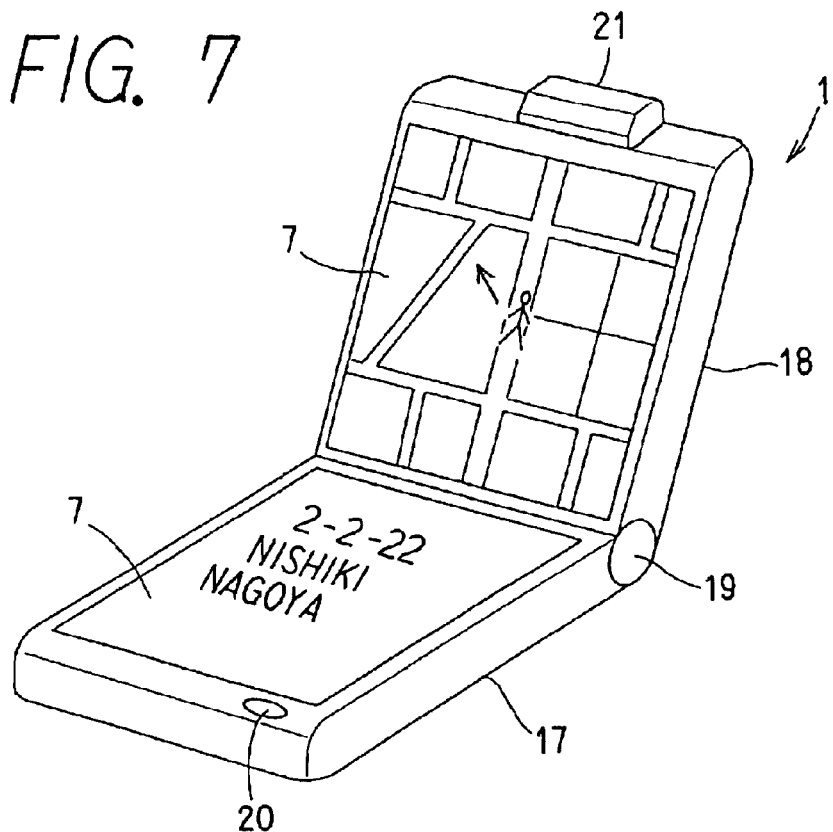
FIG. 7 is a perspective view illustrating the navigation, displaying an instance of route guidance, dismounted from the vehicle according to the embodiment.

In the portable mode, the controller 5 rotates the map on the LCD 7 90 degrees to show upward as shown in FIG. 7 and shows the map at a maximum scale as opposed to the case of the in-vehicle mode in FIG. 6. The map includes walking routes, which are impassable by the vehicle and excluded from the routes in the in-vehicle mode. These are a stair, pedestrian bridge, vehicle-restricted road, park, walkway, mountain path, seashore, pedestrian subway, premises of the public or leisure facilities and others. The controller 5 includes the above walking routes to set the walk routing, thus enabling the user to reach the destination even through the vehicle-impassable route shown in the LCD 7.

Here, a back screen of the LCD 7 is set brighter in the portable mode than in the in-vehicle mode. This helps to keep display visibility in a bright spot outside the vehicle when the main unit 1 is detached from the vehicle.

The controller 5 displays the cursor indicating the existing position in a shape (for instance, manlike shape) different from that in the vehicle mode with the address of the existing position. This enables the user to recognize the shift to the portable mode from the in-vehicle mode and to walk with confirming the address, hence leading to enhancement of the usability. Here, the address is desired to include a street level.

The controller 5 erases or disables the touch panel buttons 22 which are used in the vehicle mode or displays anew the touch panel buttons that are only used in the portable mode. While an adjusting button for a vehicle speed is erased, buttons dedicated to the portable mode are newly added on the LCD 7. These (not shown) are a parking-confirming button for confirming a parking period, a vehicle-returning button for returning to the vehicle, and a temporary-vehicle-returning button for temporarily returning to the vehicle (passing the vehicle to a final destination). In addition, a walk road along a vehicle road is empathized on the LCD 7 in comparison with a vehicle road, which enhances the visibility of the walking side.

During the driving in the vehicle mode, only simple manipulating operations such as expanding or reducing a map are allowed due to safe driving. In the other hand, all operations in any usage are allowed to run in the portable mode due to the less risk of the manipulating operations. Routing search to the destination is thus allowed, being restricted during the driving in the in-vehicle mode.

Here, when the user sets a destination to execute a routing search from the existing position, the controller 5 changes the kinds of recommended routings from those in the in-vehicle mode. Namely, the in-vehicle mode involves the routings of a shortest distance, expressways preferential, and local streets preferential. On the other hand, the portable mode involves routings of, for instance, less vertical intervals, less traffic signals, straighter lines, more roof-covered (for a rain), and insides of the premises or facilities of the department store in addition to a shortest distance.

In searching for the recommended routing, the controller 5 includes, for searched references, the routes excluded in the in-vehicle mode due to their impassability for the vehicle. For instance, a person can walk a stair, pedestrian bridge, vehicle-restricted road, park, walkway, mountain path, seashore, pedestrian subway, and premises of the public or leisure facilities. Furthermore a one-way traffic where a person can pass in both ways is added while the expressways or freeways impassable for a person are naturally excluded.

In the portable mode, in setting a destination or even in other usages, a reduced map covering more than 800 meter distance is not displayed. A large-scaled large-area map seems to be not often requested and to reduce the usability if displayed.

In the subway or building where the GPS satellite radio wave is not receivable, the existing position can be calculated if an acceleration sensor is provided in the main unit 1. If an external signal receiver is provided in the main unit 1, the existing position can be also calculated based on the position information from the premises base station.

The completion of the above routing search leads the controller 5 to display the recommended routing to the destination, where necessary, using a voice guidance. The user thus walks along the recommended routing. Here, as shown in FIG. 7, the controller 5 enables a destination-direction arrow to be continuously shown with the recommended routing being recognizably shown on the map. The user is conscious of the destination by the destination-direction arrow to be able to walk for the destination. The continuous display of the destination-arrow in the embodiment therefore has a beneficial effect.

Figure 8:
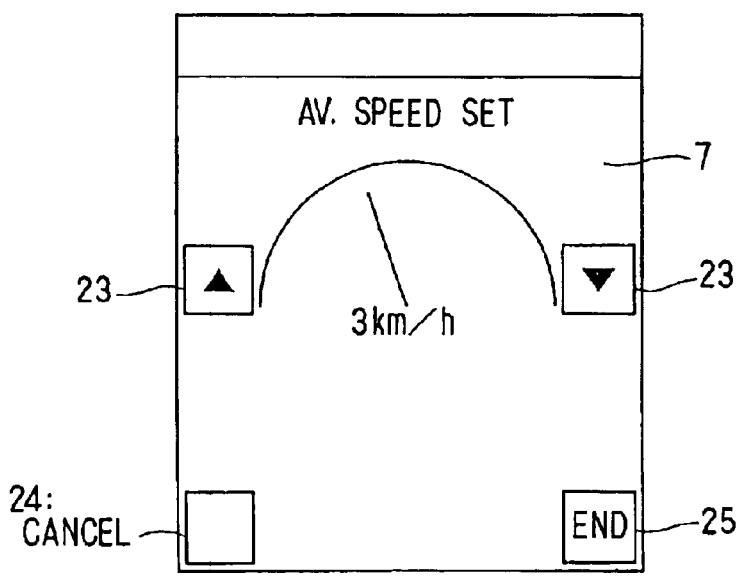
FIG. 8 is a view illustrating a display of an average speed setup according to the embodiment.

A time distance, as a function of the main unit 1, can be calculated through an input of an average speed at which the user walks on an average-speed setting window. As shown in FIG. 8, the user can input a speed at which the user walks, runs or rides on a bicycle through setting buttons 23 on the average-speed setting window on the LCD 7. The average speed can be inputted in the range of 1 to 10 km/h at every 1 km/h in the portable mode while inputted in the range of 10–100 km/h at every 5 km/h in the in-vehicle mode. Thus, it is only allowed to input the speed at which a person can move in the portable mode. In the in-vehicle mode, two kinds of local-road and expressway speeds can be inputted, which enables the main unit 1 to calculate a time distance with considering the difference between the local road and the expressway. In the portable mode, only one speed can be inputted.

Touching a cancel button 24 on the average-speed setting window causes the average speed to return to a default value previously set while touching an end button 25 causes the setting to end. The input of the average speed at which the user moves thus provides a time distance to a destination.

The controller 5, as described above, guides the walking user in following the set routing as in the in-vehicle mode. For instance, when the user is approaching an intersection where the user should turn, the controller 5 displays, on the LCD 7, a message such as "turn to the right 10 meters ahead" with the corresponding voice guidance. Here, the guidance is outputted at the point closer to the target intersection with comparing to the point in the in-vehicle mode. In the in-vehicle mode, a longer distance is required to change the driving course to turn according to the voice guidance. In the portable mode, there is no problem in outputting the direction-change guidance at the point just close to the intersection to turn.

The controller 5 has a function of confirming a direction-change point such as a target intersection through turning on of a confirming button (not shown) illustrated on the LCD 7. Turning on of the confirming switch causes the controller 5 to output through the display or voice the guidance of "turn this intersection" or "turn the next intersection" based on the relation between the guidance point and existing position.

The controller 5 finishes the routing assistance at a point, for instance, being 20 meters short of the destination. In the in-vehicle mode, the routing assistance is finished at the point 200 meters from the distance since the high-speed vehicle may pass through the destination. In the portable mode, it can be finished also at the destination itself since the user may not pass through the destination.

When the user returns to the vehicle, the user pushes the vehicle-returning button on the LCD 17. The controller 5 displays a recommended routing for the return to the vehicle by setting, as a destination, the vehicle position described above. The vehicle position has been stored in the memory within the controller 5 or the external memory 6. Setting the recommended routing thereby enables the user to easily return to the vehicle by following the routing assistance.

When the user wants to return to the vehicle temporarily, for instance, for putting baggage in the vehicle, the user pushes the temporary-vehicle-returning button on the LCD 7. The controller 5 then displays a recommended routing to the destination including the vehicle position as a passing point, thus enabling the user to effectively drop at the vehicle to move to the destination by following the routing assistance shown on the LCD 7.

When the user furthermore wants to confirm the parking period of the vehicle, the user push the parking-confirming button to confirm the elapsed time since the user started to execute the portable mode with leaving the vehicle.

The controller 5 then displays, on the LCD 7, the parking period by calculating the time distance between the leaving time and the time when parking-confirming button is pushed. The user thus confirms the parking period to estimate the pay if the vehicle is parked in a pay parking lot.

In the above embodiment, the main unit 1 of the navigation system has, in addition to the in-vehicle mode, the portable mode which becomes functional by detecting the detachment of the main unit 1 from the vehicle. The portable mode disables or modifies the functions involved in the in-vehicle mode, or enables the functions not involved in the in-vehicle mode. This approach enables two modes to be executed properly for the corresponding uses.

The main unit 1 can be folded in half to excel in portability when unused. When attached to the mounter 2, the main unit 1 uses both LCDs 7 of the first and second bodies 17 and 18 to display a large and effective image by combining both the LCDs 7.

The above embodiment may be modified as follows. The detection of the detachment of the main unit of the navigation system may be based on the ON/OFF of a switch detecting attachment to the mounter. It may be also based on the shift to the secondary battery powering or on the state of a shot-range communication method which becomes uncommunicative with the vehicle if the main unit is apart from the vehicle.

The main unit may be attached to a bicycle with a mounting kit. Here, a new mode dedicated to a bicycle usage may be added as another portable mode. A pair of eyeglasses connected to the main unit of the navigation may be adopted as a display, so that a user is guided in routing assistance with looking forward.

The present invention may be applied to a cradle-attachment type navigation system which is attached to a cradle. Here, an in-vehicle or a portable mode may be determined based on the states of input/output interfaces between the cradle and the navigation system. The cradle-attachment type navigation is often used to set a destination and other places with being detached from the cradle. Hence, the portable mode instead of the in-vehicle mode may be started as soon as the navigation turns on.

What is claimed is:

1. A navigation system connectable with a vehicle, the navigation system comprising:
   determining means which determines whether connected to or disconnected from the vehicle;
   controlling means which executes an in-vehicle mode according to a determination of connection to the vehicle and a portable mode according to a determination of disconnection from the vehicle; and
   storing means in which the controlling means stores a shift position where the in-vehicle mode is shifted into the portable mode,
   wherein the controlling means differentiates functions between the in-vehicle mode and the portable mode, and
   wherein the controlling means enables a predetermined function, which is not functional in the in-vehicle mode, for the portable mode when the portable mode is executed.

2. A navigation system connectable with a vehicle, the navigation system comprising:
   determining means which determines whether connected to or disconnected from the vehicle;
   controlling means which executes an in-vehicle mode according to a determination of connection to the vehicle and a portable mode according to a determination of disconnection from the vehicle; and
   storing means in which the controlling means stores shift time when the in-vehicle mode is shifted into the portable mode,
   wherein the controlling means differentiates functions between the in-vehicle mode and the portable mode, and
   wherein the controlling means enables a predetermined function, which is not functional in the in-vehicle mode, for the portable mode when the portable mode is executed.

3. A navigation system connectable with a vehicle, the navigation system comprising:
   determining means which determines whether connected to or disconnected from the vehicle; and
   controlling means which executes an in-vehicle mode according to a determination of connection to the vehicle and a portable mode according to a determination of disconnection from the vehicle,
   wherein the controlling means differentiates functions between the in-vehicle mode and the portable mode,
   wherein the controlling means enables a predetermined function, which is not functional in the in-vehicle mode, for the portable mode when the portable mode is executed, and
   wherein, in the portable mode, the controlling means continuously allows a user to operate all functions possessed by the controlling means.

4. A navigation system connectable with a vehicle, the navigation system comprising:
   determining means which determines whether connected to or disconnected from the vehicle;
   controlling means which executes an in-vehicle mode according to a determination of connection to the vehicle and a portable mode according to a determination of disconnection from the vehicle; and
   displaying means,
   wherein the controlling means differentiates functions between the in-vehicle mode and the portable mode,
   wherein the controlling means enables a predetermined function, which is not functional in the in-vehicle mode, for the portable mode when the portable mode is executed, and
   wherein, in the portable mode, the controlling means continuously displays, on the displaying means, an address where the navigation system is being located.

5. A navigation system connectable with a vehicle, the navigation system comprising:
   determining means which determines whether connected to or disconnected from the vehicle;
   controlling means which executes an in-vehicle mode according to a determination of connection to the vehicle and a portable mode according to a determination of disconnection from the vehicle; and
   displaying means,
   wherein the controlling means differentiates functions between the in-vehicle mode and the portable mode,
   wherein the controlling means enables a predetermined function, which is not functional in the in-vehicle mode, for the portable mode when the portable mode is executed, and
   wherein, in the portable mode, the controlling means continuously displays, on the displaying means, a direction to a set destination.

6. A navigation system connectable with a vehicle, the navigation system comprising:
   determining means which determines whether connected to or disconnected from the vehicle;
   controlling means which executes an in-vehicle mode according to a determination of connection to the vehicle and a portable mode according to a determination of disconnection from the vehicle;
   displaying means; and
   a touch panel button which is illustrated on the displaying means and which is functional as a manipulation button,
   wherein the controlling means differentiates functions between the in-vehicle mode and the portable mode,
   wherein the controlling means disables a predetermined function being functional in the in-vehicle mode when the portable mode is executed,
   wherein, in the portable mode, the controlling means chooses either of a first and second cases,
   wherein in the first case a predetermined touch panel button, which is illustrated and functional in the in-vehicle mode, is not illustrated, and
   wherein in the second case the predetermined touch panel button is disabled with being still illustrated.

* * * * *